US006213234B1

(12) United States Patent
Rosen et al.

(10) Patent No.: US 6,213,234 B1
(45) Date of Patent: *Apr. 10, 2001

(54) VEHICLE POWERED BY A FUEL CELL/GAS TURBINE COMBINATION

(75) Inventors: Harold A. Rosen, Santa Monica; Jeffrey W. Willis, Los Angeles, both of CA (US)

(73) Assignee: Capstone Turbine Corporation, Woodland Hills, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,968

(22) PCT Filed: Oct. 14, 1998

(86) PCT No.: PCT/US98/21687

§ 371 Date: Dec. 23, 1998

§ 102(e) Date: Dec. 23, 1998

(87) PCT Pub. No.: WO99/19161

PCT Pub. Date: Apr. 22, 1999

Related U.S. Application Data

(60) Provisional application No. 60/061,817, filed on Oct. 14, 1997.

(51) Int. Cl.[7] .................................................. B60L 11/18
(52) U.S. Cl. ............................................ 180/65.3; 429/13
(58) Field of Search ................................. 180/65.2, 65.3, 180/65.4, 65.6, 309; 429/13, 23, 33

(56) References Cited

U.S. PATENT DOCUMENTS

| 4,004,947 | 1/1977 | Bloomfield . | |
|---|---|---|---|
| 5,248,566 | * 9/1993 | Kumar et al. | 429/19 |

(List continued on next page.)

OTHER PUBLICATIONS

Dawn Stephenson et al., "Parametric Study of Fuel Cell and Gas Turbine Combined Cycle Performance," The American Society of Mechanical Engineers, 1997, pp. 5–10, Issue 97 GT–340, published by ASME, New York, New York.

Robin MacKay, "Development of a 24 kW Gas Turbine–Driven Generator Set for Hybrid Vehicles," SAE Technical Paper Series, Reprinted from: Advancements in Electric and Hybrid Electric Vehicle Technology (SP–1023), Feb. 28–Mar. 3, 1994, pp. 99–105, vol. 940510, SAE, Warrendale, PA.

(List continued on next page.)

*Primary Examiner*—J. J. Swann
*Assistant Examiner*—David R. Dunn
(74) *Attorney, Agent, or Firm*—Brooks & Kushman P.C.

(57) ABSTRACT

A hybrid electric vehicle powered by a combination fuel cell and a gas turbine driven generator. The fuel cell is sized relative to the gas turbine and the vehicle such that up to about 50 percent of the vehicle's maximum sustainable power is supplied by the fuel cell electrical power output. This relative power source size achieves improved fuel consumption compared to vehicles powered by combustion engines without the cost penalty associated with a fuel cell large enough to power the vehicle. At low power requirements, the fuel cell efficiently provides all or most of the vehicle's power requirements. As the power requirements increase, additional fuel is burned in the gas turbine.

20 Claims, 9 Drawing Sheets

U.S. PATENT DOCUMENTS

| | | | |
|---|---|---|---|
| 5,409,784 | * 4/1995 | Bromberg et al. | 429/13 |
| 5,413,879 | 5/1995 | Domeracki et al. . | |
| 5,434,016 | * 7/1995 | Benz et al. | 429/13 |
| 5,482,791 | * 1/1996 | Shingai et al. | 429/23 |
| 5,532,573 | * 7/1996 | Brown et al. | 322/22 |
| 5,678,647 | 10/1997 | Wolfe et al. . | |
| 5,693,201 | * 12/1997 | Hsu et al. | 204/241 |
| 5,708,312 | 1/1998 | Rosen et al. . | |
| 5,762,156 | * 6/1998 | Bates et al. | 180/165 |
| 5,811,201 | * 9/1998 | Skowronski | 429/17 |
| 5,968,680 | * 10/1999 | Wolfe et al. | 429/13 |

OTHER PUBLICATIONS

Paul Craig, "The Capstone Turbogenerator as an Alternative Power Source," SAE Technical Paper Series, Reprinted from: Electric and Hybrid Vehicle Design Studies (SP–1243), Feb. 24–27, pp. 135–138, vol. 970292, SAE, Warrendale, PA.

Aldo Vieira de Rosa, "Fuel Cells", Chapter 11, ¶¶ 11.1, 11.12.3, unpublished text, Stanford University, CA, Jan. 97(?).

Mark Allan Gottschalk, "Will Fuel Cells Power An Automotive Revolution?", Design News, Jun. 22, 1998, pp. 86–90.

Dennis Burkhart, "Strategic Technological Partnerships,", Southern California Edison Technology Report, Nov. 1977, No. 7, Research and Technology Applications Department of Southern California Edison Company.

* cited by examiner

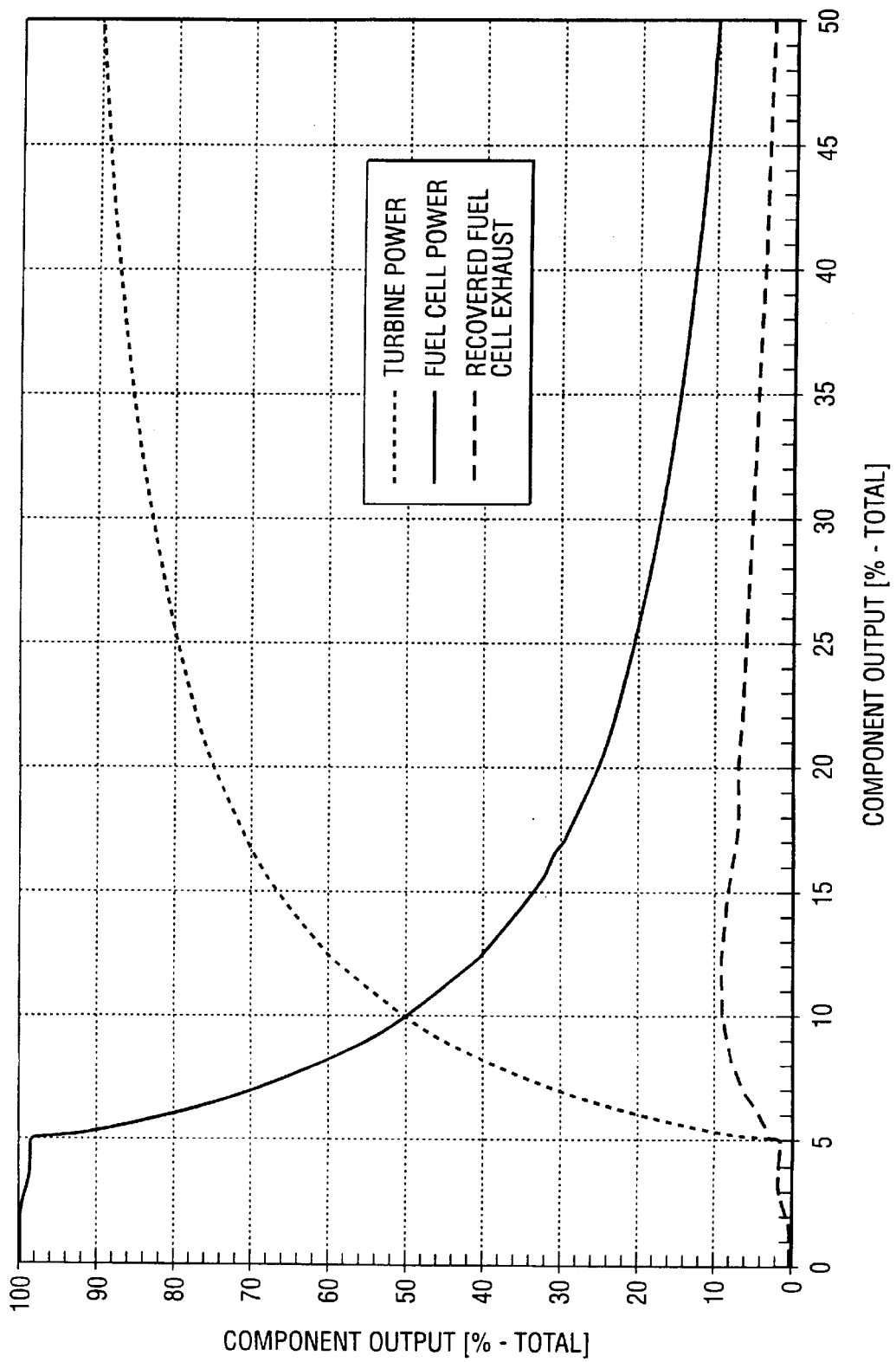

VEHICLE POWERED BY A FUEL CELL/GAS TURBINE COMBINATION

This application claims benefit of provisional application Ser. No. 60/061,817, filed Oct. 14, 1999. This application is a 371 of PCT/US98/21687, filed Oct. 14, 1998.

TECHNICAL FIELD

The present invention relates to a hybrid electric vehicle having a combination fuel cell and a gas turbine power generator and in particular, to a hybrid electrical vehicle having a combination fuel cell and a gas turbine power generator wherein the majority of the power to propel the vehicle under steady-state urban driving conditions is derived from the fuel cell.

BACKGROUND ART

The most popular power source for automotive applications is an internal combustion engine connected to a mechanical drive train which in turn rotates at least one wheel to drive the automobile. However, state and federal automotive emission laws are becoming increasingly more difficult to meet using current internal combustion engines powered by hydrocarbon fuels which emit large quantities of carbon dioxide, carbon monoxide, and various nitrogen oxides as by-products. Additionally, even the most efficient internal combustion engines are not very efficient, having a maximum efficiency of approximately 35% or less. The efficiency of an internal combustion engine increases as the energy output increases. During urban driving cycles where the required power output is the lowest, the efficiency is even lower.

As an alternative, electric vehicles were developed with the electric energy stored in large battery packs that replace the internal combustion engine and powered the automobile. The stored energy drives at least one electric motor which in turn rotates at least one drive wheel. However, there are still many drawbacks with the expensive battery packs such as long recharge periods, minimal driving distances before recharging, lack of power for passing and climbing hills, and excessively large and heavy battery packs.

Hybrid vehicles have been designed wherein for example, the automobile is continuously powered by a relatively low-powered, fuel-burning power source such as turbogenerator which can be run near or at peak efficiency. When extra power is required, for example, during acceleration or hill climbing, the surge power is provided by a storage device which stores energy during steady state driving conditions such as driving at a constant speed on a level road. Prior art storage devices include flywheels, pressurized fluid accumulators, batteries, and capacitors. The fundamental problem with these systems is that maximum efficiency is still limited by the fuel burning combustion engine whether it be internal combustion, spark ignited, diesel or a gas turbine.

A relatively new technology proposed for powering automobiles is the use of fuel cells to provide electric power. A fuel cell creates electricity through a chemical reaction wherein a hydrocarbon fuel oxidizes and forms carbon dioxide and water as by-products. Fuel cells have an efficiency of approximately 70–80%, much more efficient than internal combustion engines at the relatively low power requirements of urban driving. However, for a fuel cell to provide all the necessary power to an automobile to climb hills, drive at highway speeds, and supply passing power, the fuel cell would be too large, expensive, and heavy for an automobile. See for example ASME 97-GT-340, Parametric Study of Fuel Cell and Gas Turbine Combined Cycle Performance by Stephenson, Dawn and Ritchey, Ian.

DISCLOSURE OF INVENTION

The present invention solves the above-mentioned problems and provides a clean-burning, efficient, economical, automotive power source by converting a substantial portion of the fuel consumed by the vehicle directly to electrical energy using a fuel cell at very efficient conversion rates without the prohibitive cost of the existing fuel cell vehicle. At higher power requirements, a gas turbine generates additional power.

Accordingly, a hybrid electric vehicle is provided with an electric motor drivingly connected to a at least one driven wheel. The vehicle has a source of hydrocarbon fuel, a fuel cell for converting the hydrocarbon fuel and oxygen contained in air directly to electric energy and fuel cell exhaust gas, and a gas turbine engine powered by fuel cell exhaust gas as well as by directly burning hydrocarbon fuel. An electric generator is coupled to the gas turbine to provide electrical energy which in conjunction with the electrical output of the fuel cell powers the vehicle's electric motor. A power controller responsive to a demand signal from a vehicle occupant regulates the operation of the fuel cell and the gas turbine to cause the fuel cell and the fuel cell exhaust gases to provide vehicle power when the vehicle's need are generally below the maximum fuel cell power output level, and to provide hydrocarbon fuel to the gas turbine to generate additional power as required up to a maximum sustainable power level. The fuel cell and the gas turbine are sized relative to the vehicle such that the maximum electrical power output of the fuel cell is no greater than about 50% and, preferably, no greater than about 25%, of the maximum sustainable power level.

BRIEF DESCRIPTION OF DRAWINGS

FIG. 10 is a graph illustrating the percent of total output of the gas turbine, the fuel cell, and the recovered fuel cell exhaust gases for different total power outputs.

BEST MODE FOR CARRYING OUT THE INVENTION

Figure 1:
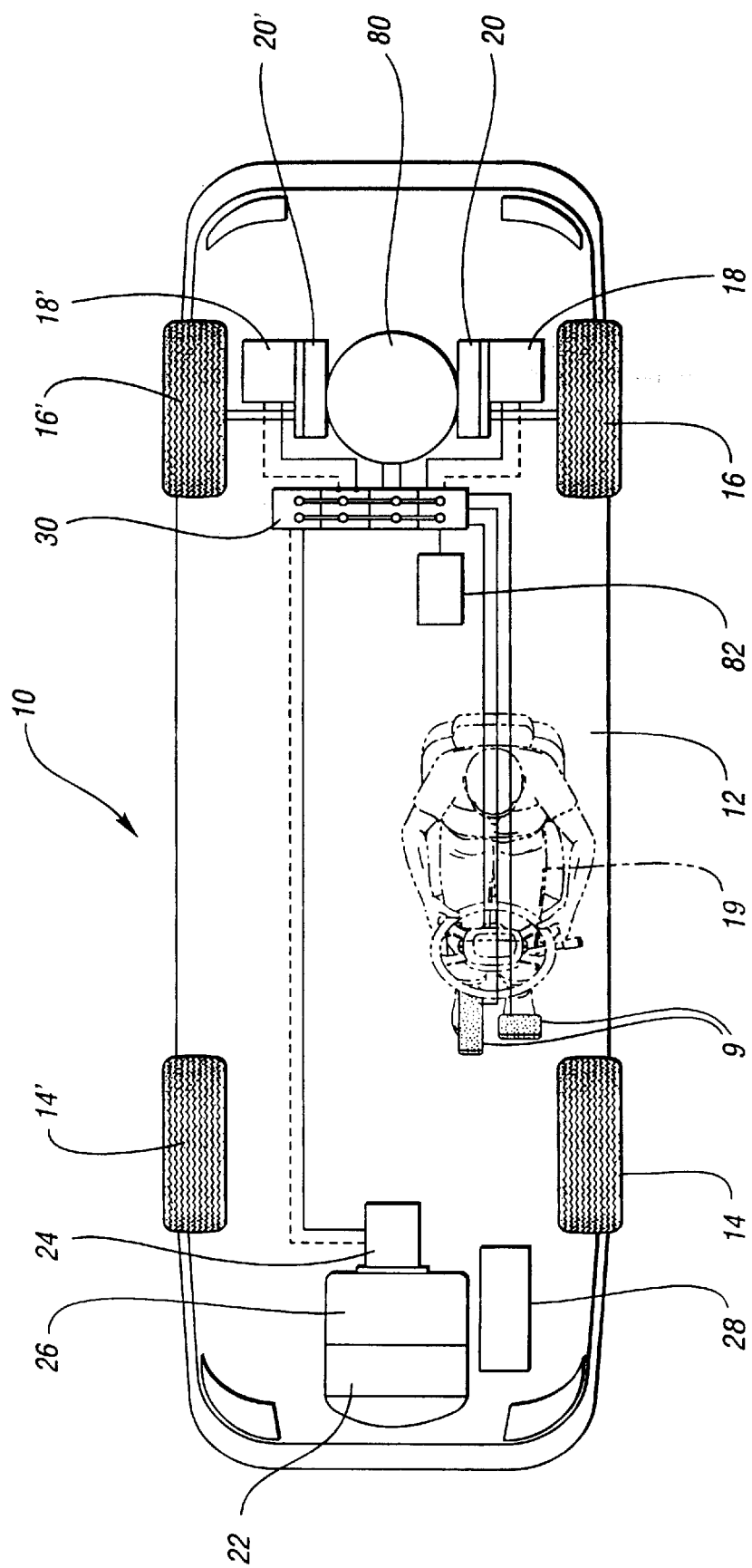
FIG. 1 is a schematic view of a hybrid electric vehicle utilizing the fuel cell/gas turbine powered generator of the present invention.

FIG. 1 schematically illustrates a hybrid electric vehicle 10 of the present invention. Hybrid electric vehicle 10 has a body 12, a pair of front wheels 14 and 14', and a pair of rear wheels 16 and 16'. At least one of the wheels is drivingly connected to an electric motor 18, 18'. In the disclosed embodiment rear wheels 16 and 16' are connected to electric motors 18 and 18' and by the drive train 20 and 20' as shown. Alternatively, front wheels 14 can be driven individually or in combination with driven rear wheels 16 and 16'. The hybrid electric vehicle 10 is driven by providing electrical power to electric motors 18 and 18' supplied by two sources—fuel cell 22 and electric generator 24 which is driven by gas turbine 26. The fuel source 28, such as in, gasoline tank or alternatively a propane tank (not shown), stores hydrocarbon fuel, such as gasoline or other hydrocarbon fuel, to be supplied to the fuel cell 22 and gas turbine 26.

A power controller 30 is responsive to a control or "demand" signal, such as acceleration/brake signals 9 generated by a vehicle operator 19, to regulate the electric motors 18 and 18'. The power controller 30 controls the motor torque by regulating a delivery of hydrocarbon fuel and air to both the fuel cell 22 and the gas turbine 26. In low-load conditions, where the energy needed is less than the maximum electrical power output of the fuel cell 22, the power controller 30 causes the electricity needed by the motor to be generated by the fuel cell and by the gas turbine utilizing fuel cell exhaust gases. When the vehicle's power requirements exceed the output capacity of the fuel cell, the power controller causes additional hydrocarbon fuel and compressed air to be supplied to the gas turbine to generate additional power as needed by the vehicle up to a maximum sustainable power level.

In practicing the present invention, overall fuel economy is a trade-off of overall efficiency and system costs. Maximum overall fuel efficiency is achieved with a large fuel cell and a relatively small gas turbine which is capable of recovering energy from the fuel cell exhaust. A fuel cell/gas turbine combination of this type, which does not directly burn hydrocarbon fuel in the gas turbine, is efficient, although prohibitively expensive.

The present invention addresses this problem by sizing the fuel cell smaller than the gas turbine so that during most ordinary urban drive, the majority of the fuel will be consumed in the fuel cell. System cost will be controlled by keeping the fuel cell small and providing additional power as needed for acceleration, hill climbs, and sustained high speed cruising by burning additional hydrocarbon fuel directly in the gas turbine engine.

Ideally, for the present vehicle conditions, the fuel cell's power output and size is relative to the gas turbine and the vehicle, such that up to about 50 percent of the maximum sustainable power of the vehicle is supplied by the electric power output of the fuel cell. Preferably, up to about 25 percent of the vehicle's power at the maximum sustainable power level is supplied by the electric power output of the fuel cell. And, in the embodiment illustrated in the drawings, about 10 percent of the vehicle's maximum sustainable power is supplied by the electric power output of the fuel cell depending on the particular vehicle weight, function, and other factors.

Figure 2:
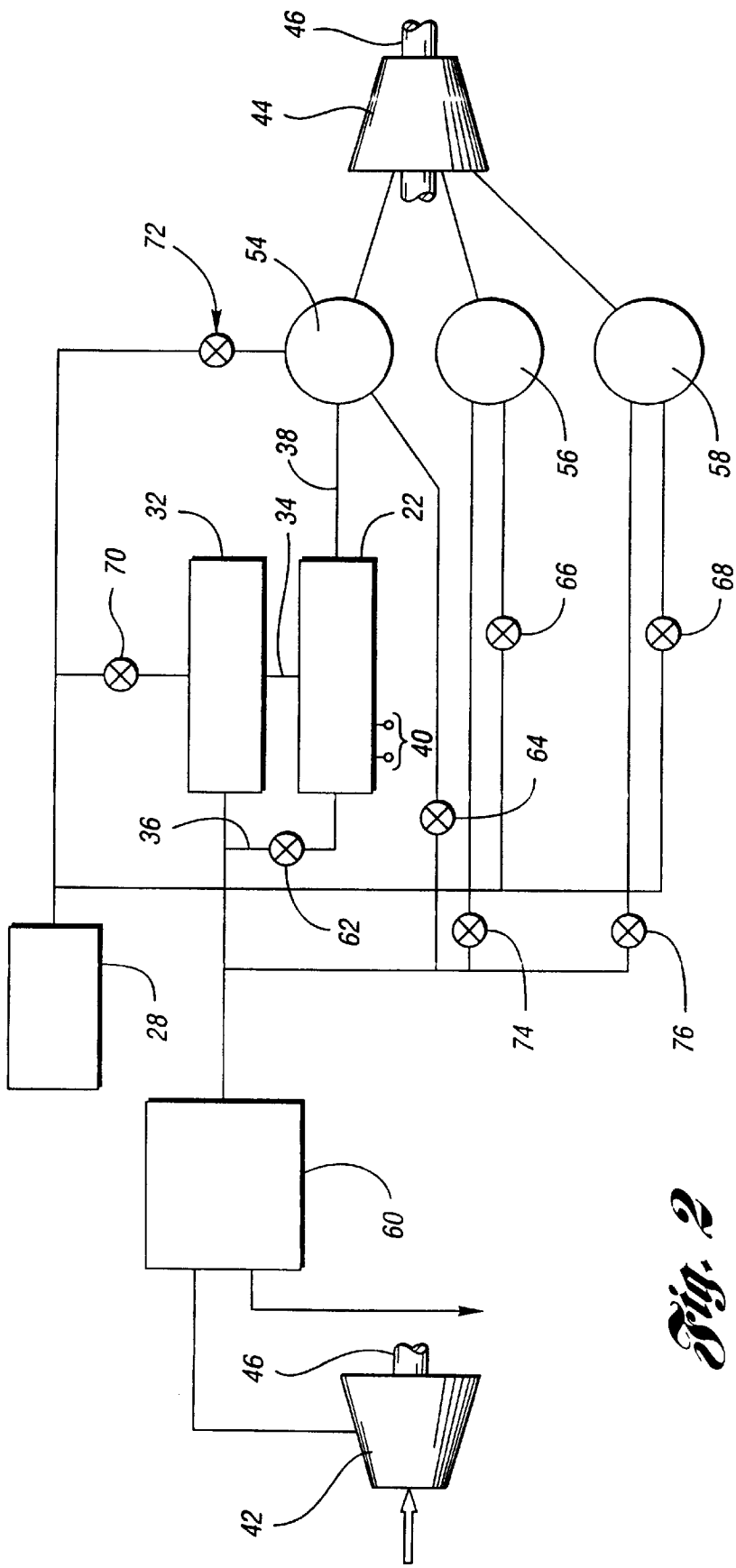
FIG. 2 is a schematic of a fuel cell/gas turbine combination of the present invention.

FIG. 2 is a schematic illustration showing the interrelationship between the fuel cell 22 and the various components which make up the gas turbine. In the present embodiment in which the hydrocarbon fuel source 28 is a holding tank for gasoline, reformer 32 is provided between the source of hydrocarbon fuel and the fuel cell 22 in order to partially oxidize the gasoline in a rich environment. The output of the reformer constitutes hot gases in which the hydrocarbons making up gasoline are broken down into free hydrogen, carbon monoxide, carbon dioxide and water.

Fuel cell 22 is provided with two inputs. Fuel input 34 is connected to reformer 32 in order to receive partially oxidized hydrocarbon fuel from hydrocarbon fuel source 28. Air inlet 36 supplies compressed preheated air to the fuel cell 22. Fuel cell 22 has an outlet at 38 for fuel cell exhaust gases and an electrical power outlet terminal 40 which provides electrical power to drive motors 18 and 18' via controller 30 (shown in FIG. 1). Fuel pumps (not shown) help pump the fuel from the fuel source 28 to fuel cell 22 and gas turbine 26 (shown in FIG. 1).

In an embodiment, a solid oxide fuel cell (SOFC) or molten carbonate fuel cell (MCFC) is used, although other fuel cells will provide satisfactory results. In solid-oxide and molten-carbonate fuel cells, the arrangement of electrodes, electrolyte, and bipolar separator has orthogonal fuel and air passages in a generally planar arrangement. This planar geometry readily lends itself to a series connection of approximately 70 cells needed to provide a loaded terminal voltage of 50 volts, which is desirable for the power controller 30. The solid-oxide fuel cells preferably operate at an outlet temperature of approximately 850° C. and at an operating pressure of three to five atmospheres, i.e., within the preferred range of the recuperating gas turbine 26. The molten-carbonate fuel cells preferably operate at an outlet temperature of approximately 650° C. and at an operating pressure of perhaps three to five atmospheres, again, an preferred operating range of the recuperating gas turbine 26. Applicants incorporate by reference an unpublished article by Professor Aldo Vieira da Rosa of Stanford University for its description of "SOFC" and "MCFC" fuel cells.

Figure 3:
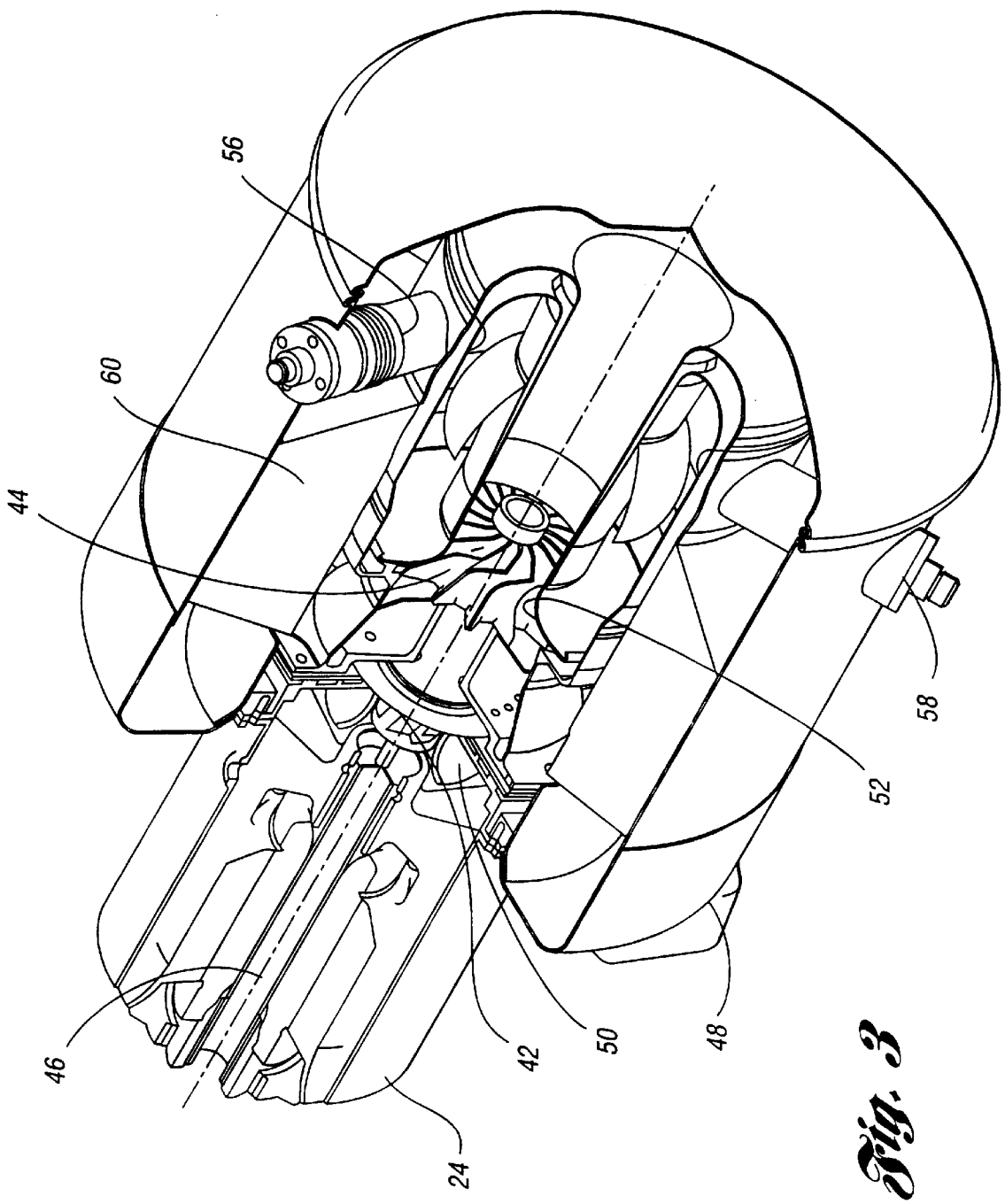
FIG. 3 is a cut-away drawing of a recuperating gas turbogenerator used in the present invention.
Figure 5:
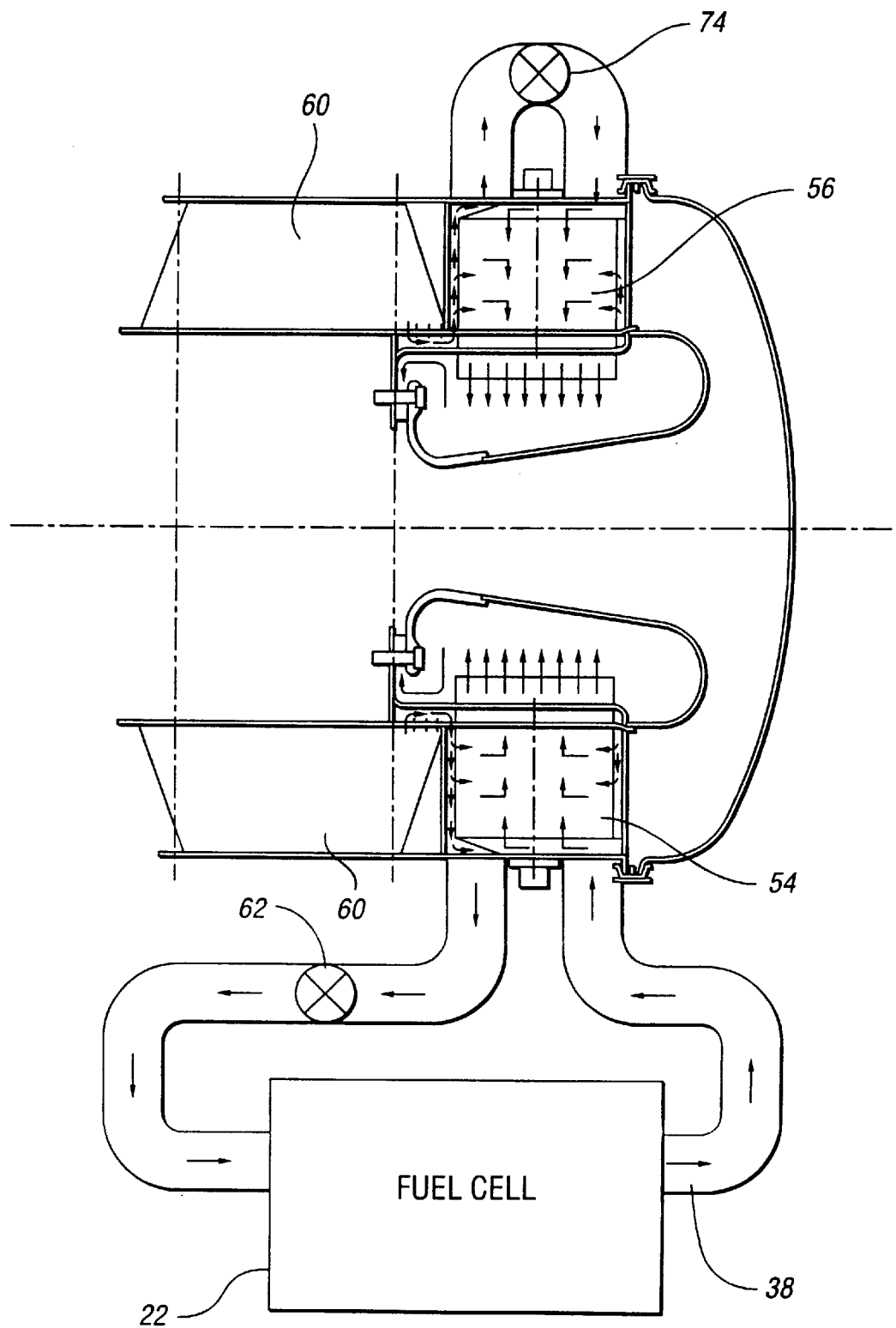
FIG. 5 is a side view of the turbogenerator showing the position of the combustors.

Gas turbine engine 26 (shown in FIG. 1) has a compressor turbine 42 and a drive turbine 44 mounted on a common rotary shaft 46. The gas turbine 26 is provided with a housing 48, as seen in FIG. 3, which defines a compressor chamber 50, generally surrounding compressor turbine 42, and a drive turbine chamber 52, generally surrounding drive turbine 44. A series of combustors 54, 56, and 58 are circumferentially oriented about housing 48 for providing hot, compressed combustion products to the drive turbine chamber 52. The hot exhaust gases from the fuel cell exhaust outlet 38 are provided to the drive turbine chamber 52 via an inlet formed in combustor 54 as best illustrated in FIG. 5. Drive turbine 44 can be powered by fuel cell exhaust gases alone or a combination of fuel cell exhaust gases and the products of combustion generated by burning of fuel directly in combustors 54, 56 and 58.

In the embodiment illustrated in FIGS. 2–5, gas turbine engine 26 is provided with a internal recuperator 60 which utilizes waste heat from the drive turbine exhaust to preheat the compressed air output from compressor turbine 42. The preheated compressed air from the recuperator 60 is provided to combustors 54, 56 and 58 as well as the air inlet 36 of fuel cell 22. Air valve 62 controls the flow of air from recuperator 60 to fuel cell 22. Air valves 64, 66, and 68 control the flow of air from recuperator 60 to combustors 54, 56 and 58 respectively. In like fashion, fuel valve 70 controls the flow of fuel to the fuel cell 22 via the reformer 32 while fuel valves 72, 74 and 76 respectively control the flow of fuel to combustors 54, 56 and 58. All the air valves and the fuel valves are controlled by controller 30 in order to precisely meter fuel and air in order to achieve the proper air/fuel balance, appropriate power output and turbine exhaust gas emissions.

Applicants hereby incorporate by reference SAE Paper No. 970292 entitled "The Capstone Turbogenerator as an Alternate Power Source," by Paul Craig, and SAE Paper No. 940510 entitled "Development of a 24 kW Gas Turbine-Driven Generator Set for Hybrid Vehicles."

Figure 4:
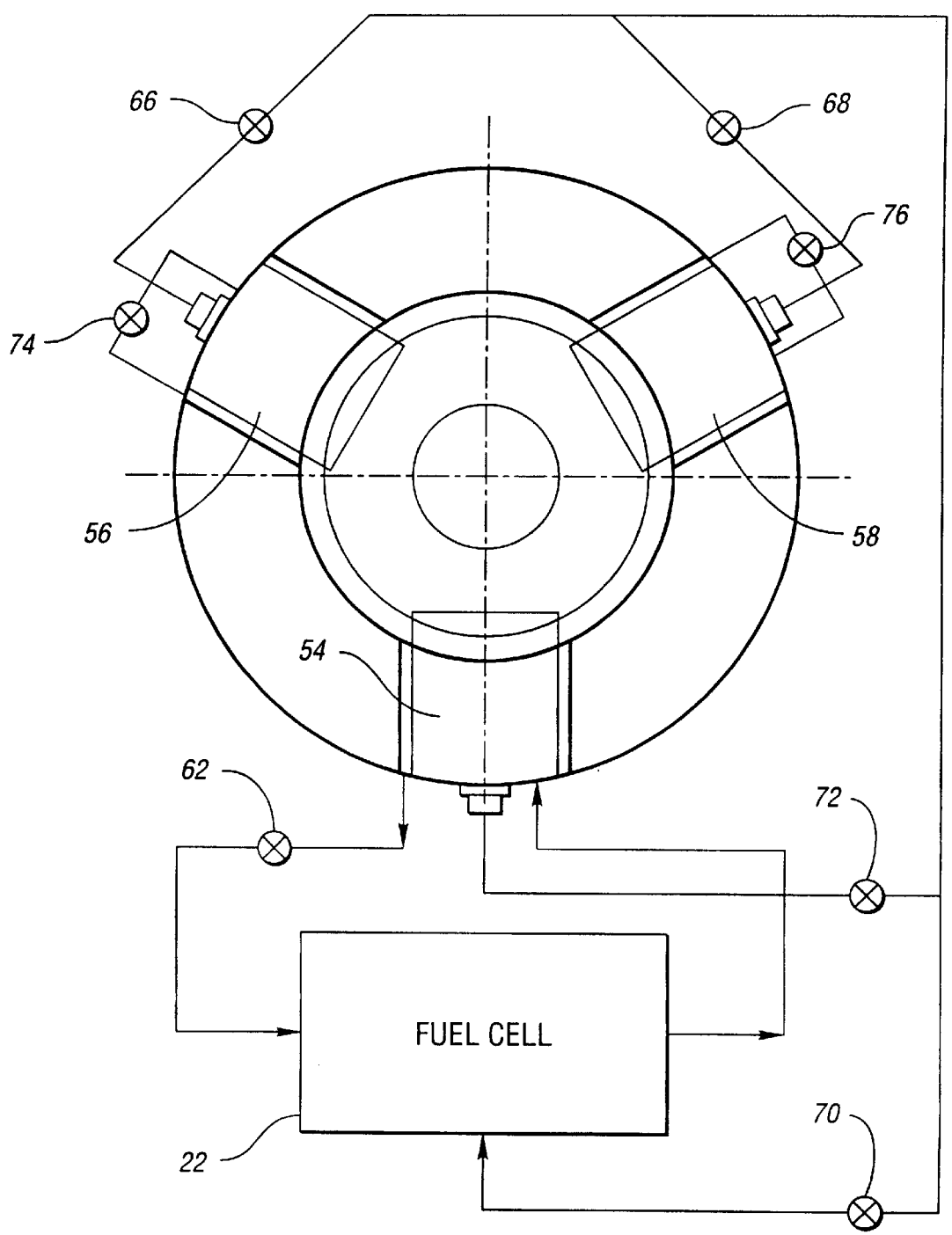
FIG. 4 is a front view of the turbogenerator showing the position of the combustors.

As illustrated in FIG. 3, electric generator 24 is directly mounted and coaxially aligned with gas turbine engine 24 and operatively connected to the gas turbine engine rotary shaft 46. The electric generator 24 provides electric power output which in combination with the fuel cell power output provides energy to drive motors 18 and 18'. One orientation of the combustors 54, 56 and 58 relative to the gas turbine housing are shown in FIGS. 4 and 5; however, it should be appreciated that alternative embodiments having more or fewer combustors will work. However the three combustors illustrated are expected to provide good performance through a wide range of operating conditions.

Figure 6:
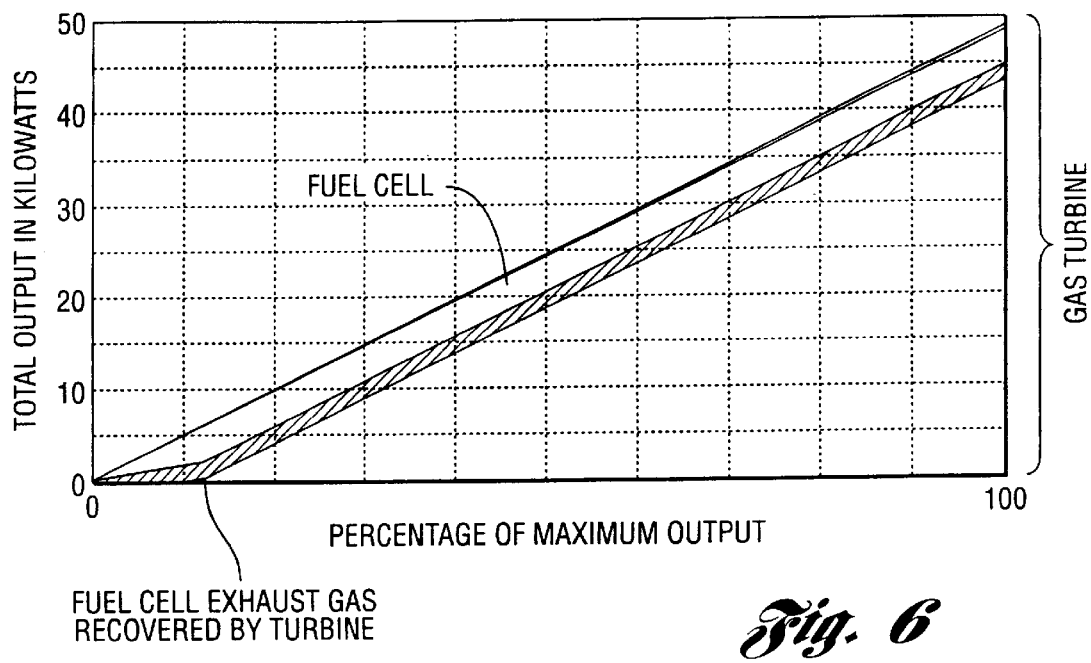
FIG. 6 is a graph of the kilowatt output versus the percent of maximum output for the fuel cell and the gas turbine.

FIG. 6 illustrates the relative power output from the fuel cell and a gas turbine at various operating conditions. The fuel cell in this particular application has a maximum electrical output of 5 kilowatts. In addition to this electrical output, the hot exhaust air from the fuel cell can provide additional 1.8 kilowatts of energy when this energy is recovered by the gas turbine by combusting the exhaust gases. Therefore, when less than 6.8 kilowatts of power is needed, all the energy can be derived from fuel supplied to the fuel cell.

When more energy is needed, the controller 30 supplies air and fuel to at least one of the combustors 54, 56 or 58. Fuel and air are proportionally supplied to the combustors in order to achieve the desired and necessary power level to operate the vehicle. At the maximum sustainable power output indicated at 100 percent in FIG. 6, the combination of fuel cell and the gas turbine driven generator will provide 50 kilowatts of power, 5 kilowatts delivered directly by the fuel cell and 45 kilowatts of power derived from the gas turbine, 1.8 kilowatts of the gas turbine's power is from fuel cell exhaust and 43.2 kilowatts of power is generated from the direct combustion of hydrocarbon fuel in the gas turbine. For different applications, the maximum output of the fuel cell and the turbine may vary. FIG. 6 merely illustrates one possible combination for this particular vehicle.

Figure 7:
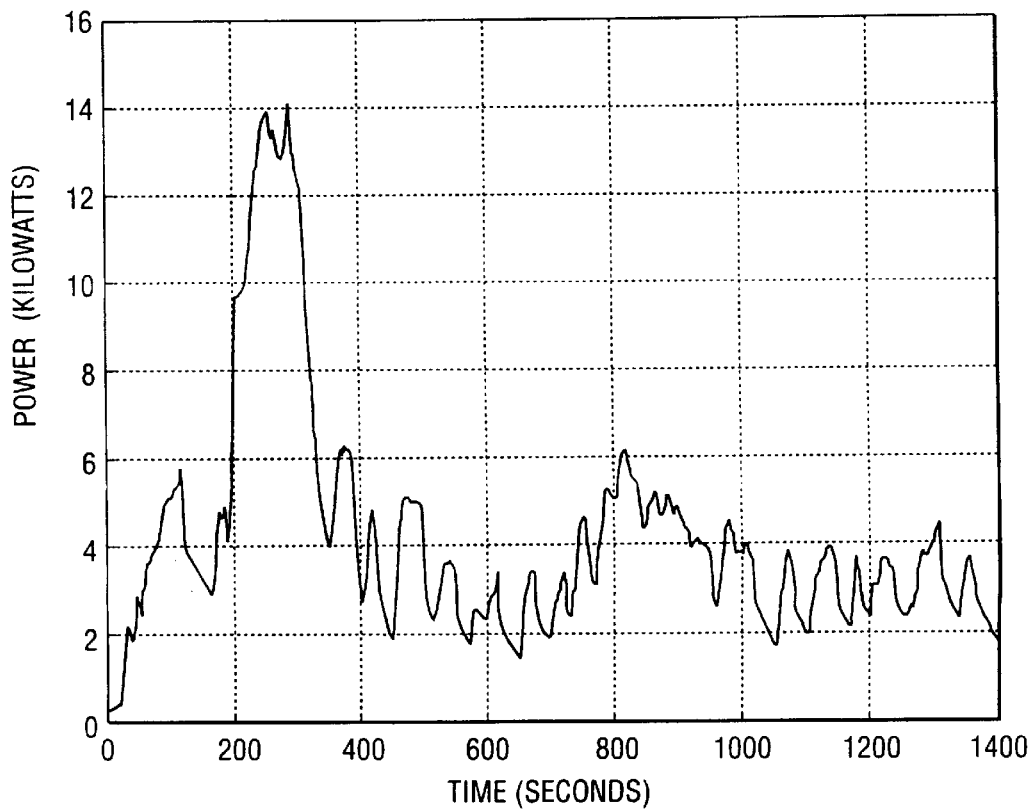
FIG. 7 is the Urban Dynamic Driving Schedule for a vehicle having a regenerative power source.

When sizing the gas turbine and fuel cell for a particular vehicle, it is important to appropriately size the gas turbine and fuel cell for the vehicle's torque requirement as dictated by the vehicle's weight, intended use, and desired performance. FIG. 7 illustrates the power needed for the typical, relatively small hybrid electric vehicle equipped with a regenerative energy storage system such as a flywheel 80 as shown in FIG. 1. A regenerative energy storage system such as flywheel 80 will store energy during vehicle braking as well as storing energy during times of low power consumption.

In the alternative, battery 82 may be charged using electromechanical means during breaking and/or low power requirements and provide surge power. The hybrid vehicle will utilize the energy stored in the flywheel during high load or acceleration maneuvers thereby limiting the power requirements of the fuel cell and gas turbine combination. The plot of power required during the urban dynamometer driving cycle for a representative hybrid vehicle shown in FIG. 7 illustrates the power requirements appropriately decreased during the high-load portions of the test schedule resulting from the dissipation of the flywheel energy.

Figure 8:
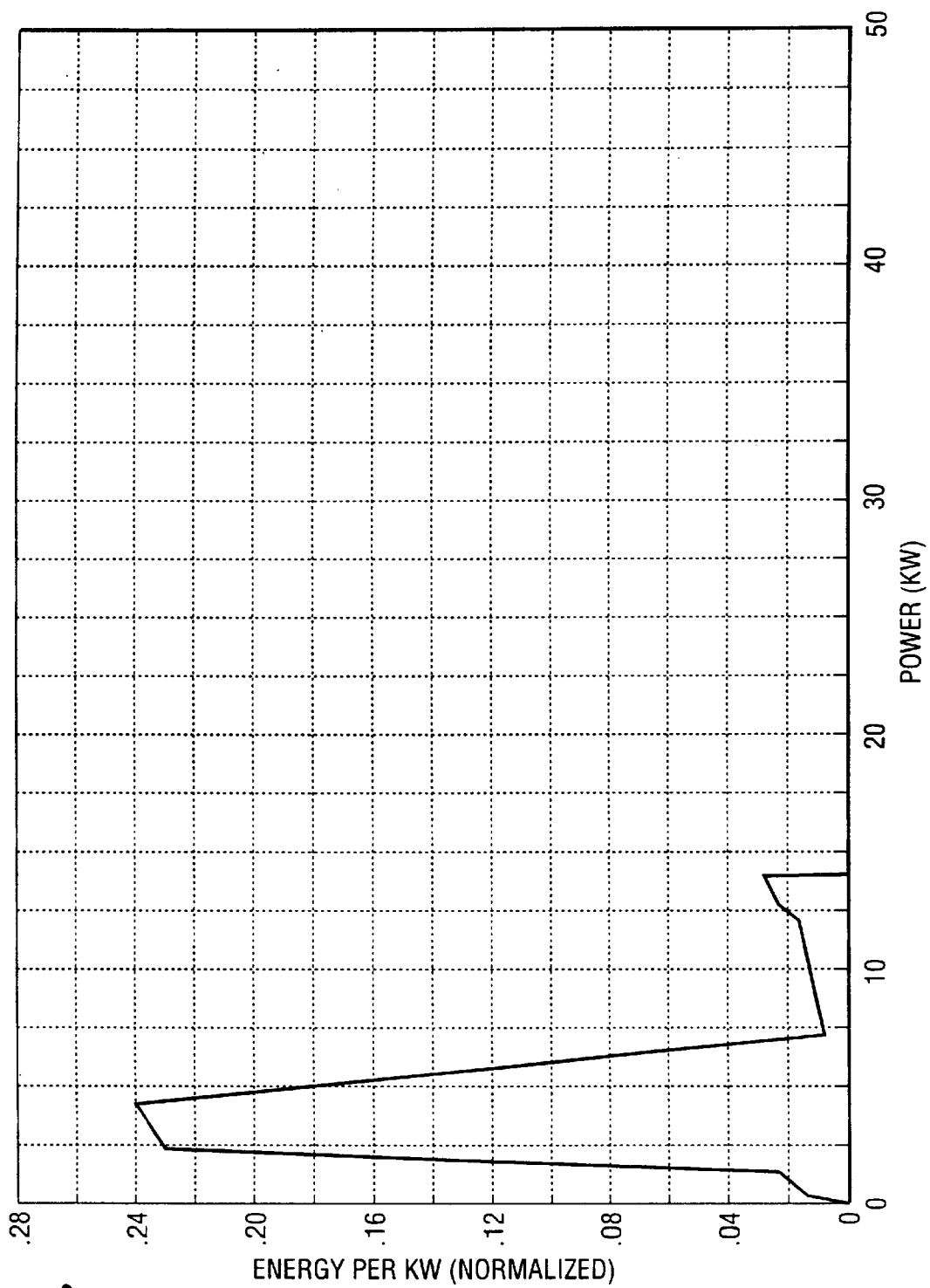
FIG. 8 is a plot of the energy density corresponding to the Urban Dynamic Driving Schedule for a vehicle having a regenerative power source.

Analyzing the load requirements of the vehicle during the Urban Dynamometer Driving Schedule as shown in FIG. 7 highlights the fact that much of the Urban Dynamometer Driving Schedule is at very low power levels. The chart in FIG. 8 is a histogram in which percentage of time spent at various power levels is normalized by power output to effectively illustrate how much fuel is used at the various power levels.

The particular vehicle shown in this example has an average power consumption of approximately 5 kilowatts even though as apparent from the plot in FIG. 7 the time weighted averaged as even lower. The fuel cell is sized in this particular embodiment so that the electrical power output of the fuel cell is approximately equal to the average power consumption level during the Urban Dynamometer Driving Schedule. Considering that an additional 1.8 kilowatts of power is generated the gas turbine from fuel cell exhaust gases, a majority of the fuel needed by the vehicle during the Urban Dynamometer Driving Schedule will be from the fuel supplied to the fuel cell.

Figure 9:
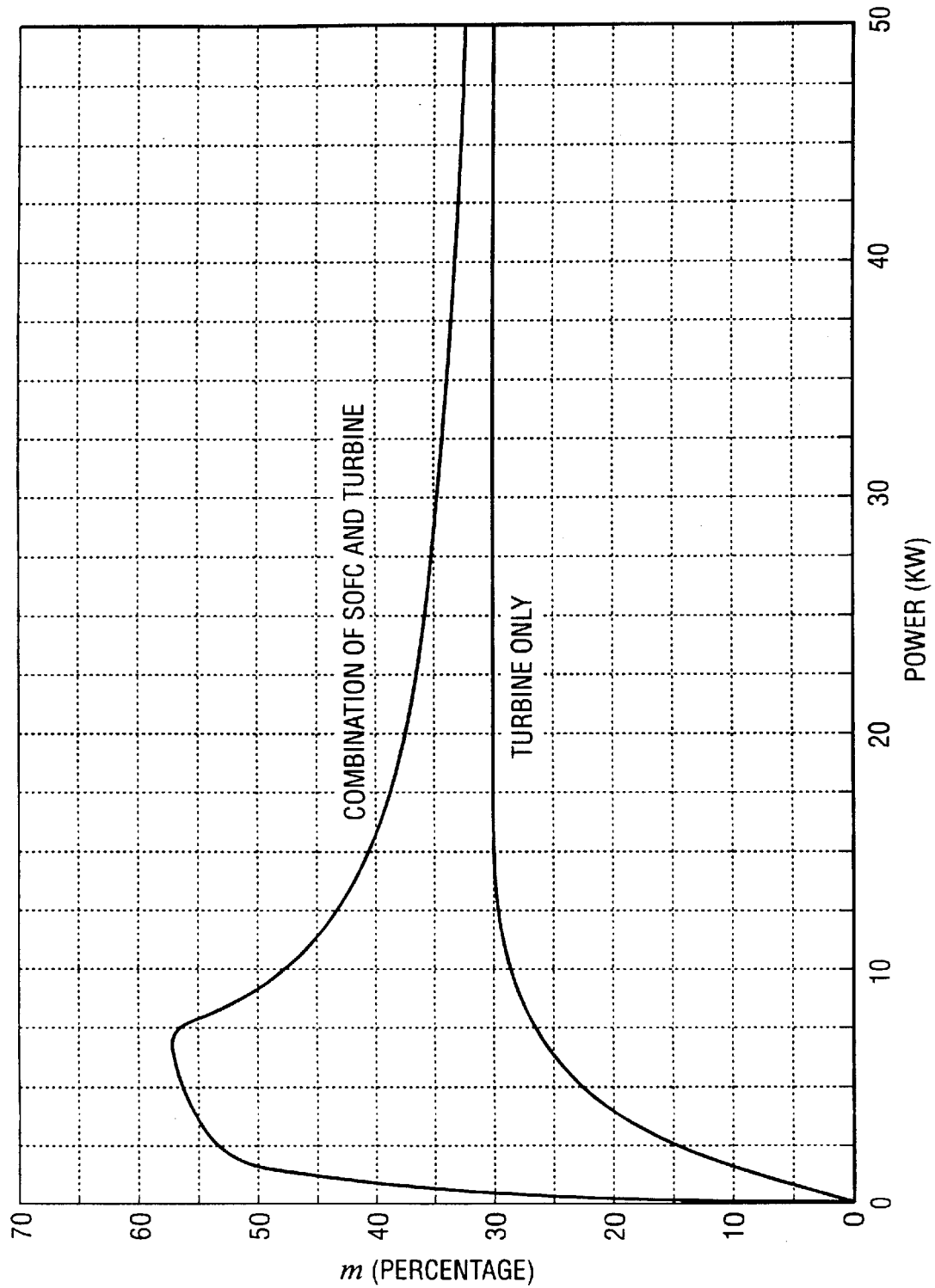
FIG. 9 is a graph comparing the efficiency of the solid oxide fuel cell/gas turbine combination with that of the turbine alone.

The fuel cell operates at a very high efficiency converting as much as 70 percent of the energy of hydrocarbon fuel into electrical energy when combined with a turbine for recovering energy from a fuel cell exhaust gas chamber. The present invention, however, achieves much of the efficiencies of a fuel cell without the prohibitive costs by sizing the fuel cell relatively small compared to the total vehicle energy needs. As illustrated in FIG. 9, the combination of a solid oxide fuel cell of the type contemplated in the present invention in conjunction with a gas turbine provides both the high power output at a relatively low cost while maintaining excellent fuel efficiency during the low power output levels where urban commuter vehicles generally operate. The present invention therefore maintains a very good cost per maximum kilowatt output while having a very high efficiency at normal urban operating conditions.

FIG. 10 illustrates the percentage of total output for the gas turbine, the fuel cell, and the recovered fuel cell exhaust at different levels of total power out put for this one particular arrangement. At power requirements under 5 kilowatts, nearly all the generated power is obtained from the fuel cell with a small percentage coming from recovering the fuel cell exhaust gases. As the power requirement increases to approximately 5 kilowatts, the gas turbine begins contributing to the percent of the total power and approaches an approximate contribution of 90% at maximum sustainable power. The remainder of the power output is derived from the fuel cell and recovered fuel cell exhaust gases.

The vehicle according to the present invention will have the fuel cell sized relative to the gas turbine so when the vehicle is operating at the average power level required by the vehicle during the Urban Dynamometer Driving Schedule over about 50 percent of the vehicle's power needs are supplied by the electrical power output of the fuel cell. Preferably, over about 60 percent of the vehicle's power needs will be supplied by the electrical power output of the fuel cell when a vehicle is operating at average power level occurring during the Urban Dynamometer Driving Schedule, and most preferably, as shown with reference to the present illustrated embodiment, two-thirds of the vehicle's power needs will be provided by the electrical output of the fuel cell when operating at the average power level occurring during the urban dynamometer driving schedule. The balance of the power being supplied by the gas turbine recovering waste heat from the fuel cell exhaust.

While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention.

What is claimed is:

1. A hybrid electric vehicle having at least one electric motor drivingly connected to at least one driven wheel, the hybrid electric vehicle comprising:

a source of hydrocarbon fuel;

a fuel cell for converting hydrocarbon fuel and oxygen contained in air into a first electrical power output up to a maximum fuel cell power output, the fuel cell having a fuel inlet receiving a first supply of fuel from the fuel source, a compressed air inlet receiving a first supply of compressed air, and an outlet for fuel cell exhaust gas;

a gas turbine engine having a compressor turbine and a drive turbine mounted on a rotary shaft, a housing defining a compressor chamber and a drive turbine chamber, at least one combustor receiving a second supply of fuel from the fuel source and a second supply of compressed air supplied directly to the combustor by the compressor turbine, and an inlet for fuel cell exhaust gases in communication with the drive turbine chamber, the drive turbine being powered by at least one of the group consisting of the fuel cell exhaust gases alone and the fuel cell exhaust gases in combination with combustion products resulting from the burning of the second supply of fuel with the second supply of compressed air in the combustor;

an electric generator coupled to and driven by the gas turbine engine rotary shaft, the electric generator generating a second electrical power output which, in combination with the first power output, provides electrical energy to drive the at least one electric motor; and a power controller responsive to a control signal from a vehicle occupant to vary the output of the at least one electric motor, the power controller regulating the first and second supplies of fuel and the first and second supplies of compressed air such the fuel cell and the fuel cell exhaust gases power the vehicle when the vehicle's power needs are generally below the maximum fuel cell power output and to provide the second supply of fuel and the second supply of compressed air to the combustor of the gas turbine when the vehicle's power needs exceed the maximum fuel cell power output up to a maximum sustainable power level, wherein the fuel cell is sized relative to the vehicle and the gas turbine engine so that the fuel cell is operative to generate no greater than 50% of the maximum sustainable power level.

2. The hybrid electric vehicle of claim 1, wherein the maximum fuel cell power output is no greater than about 25% of the maximum sustainable power level.

3. The hybrid electric vehicle of claim 1, wherein the maximum fuel cell power output is about 10% of the maximum sustainable power level.

4. The hybrid electric vehicle of claim 1, wherein the fuel cell is sized relative to the gas turbine engine and the vehicle so that, when the vehicle is operating at an average power level red by the vehicle during an Urban Dynamometer Driving Schedule, over 50% of the vehicle power requirements are supplied by the first electric power output of the fuel cell.

5. The hybrid electric vehicle of claim 4, wherein over 60% of the vehicle's power needs are supplied by a first electric power output of the fuel cell when the vehicle is operating at the average power level occurring during the Urban Dynamometer Driving Schedule.

6. The hybrid electric vehicle of claim 4, wherein approximately two-thirds of the vehicle's power needs are supplied by the first electric power output of the fuel cell when the vehicle is operating at the average power level occurring during the Urban Dynamometer Driving Schedule.

7. The hybrid electric vehicle of claim 1, further including a reformer interposed between the source of hydrocarbon fuel and the fuel cell hydrocarbon fuel inlet, the reformer having an air input and partially oxidizing the hydrocarbon fuel in a fuel rich environment before introduction into the fuel cell.

8. The hybrid electric vehicle of claim 1, wherein the gas turbine engine includes an internal recuperator for transferring heat from the gas turbine engine exhaust gases to preheat the first of compressed air supplied to the fuel cell compressed air inlet.

9. A power source for a hybrid electric vehicle for generating electric power in an amount up to a maximum sustainable power level from a supply of a hydrocarbon fuel and air, the power source comprising:

an a compressor generating a supply of compressed air;

a fuel cell receiving a first quantity of the fuel and a first portion of the supply of compressed air, the fuel cell generating a first electrical power output and a supply of fuel cell exhaust gas, the first electrical power output reaching a maximum fuel cell power output no greater than 50% of the maximum sustainable power level;

a combustor receiving at least one of the group consisting of the supply of fuel cell exhaust gas and a mixture of a second quantity of the fuel and a second portion of the supply of compressed air, the combustor generating heated combustion products;

a turbine receiving the heated combustion products, the turbine generating a rotary output;

an electric generator driven by the rotary output of the turbine, the electric generator generating a second electrical power output which, in combination with the first electrical power output, provides electrical energy to drive the at least one electric motor; and a power controller responsive to a demand signal representative of an instantaneous power requirement, wherein the power controller regulates the first supply of fuel, the second supply of fuel, the first portion of the supply of compressed air, and the second portion of the supply of compressed air such that the combined first and second electrical power outputs exceed the instantaneous power requirement, and wherein the power controller shuts off the second supply of fuel when the instantaneous power requirement falls below the maximum fuel cell power output.

10. The power source of claim 9, wherein the maximum fuel cell power output is no greater than about 25% of the maximum sustainable power level.

11. The power source of claim 9, wherein the maximum fuel cell power output is about 10% of the maximum sustainable power level.

12. The power source of claim 9, including a valve for controlling the second portion of the supply of compressed air supplied to the combustor.

13. The power source of claim 9, further including a reformer for partially oxidizing the first supply of fuel.

14. The power source of claim 9, further including a recuperator for preheating the first portion of the supply of compressed air using a supply of turbine exhaust gases.

15. A method of generating electrical energy in an amount up to a maximum sustainable power level from a supplied hydrocarbon fuel and air, the method comprising:

compressing air with a compressor to obtain a supply of compressed air;

converting, in a fuel cell, a first supply of a fuel and a first portion of the supply of compressed air into a first electrical power output and a supply of fuel cell exhaust gas, the first electrical power output reaching a maximum fuel cell power output no greater than 50% of the maximum sustainable power level;

generating heated combustion products from the combustion of the supply of fuel cell exhaust gas with a second portion of the supply of compressed air and a second supply of fuel;

generating a rotary output by directing the heated combustion products through a turbine;

driving the compressor and an electric generator with the rotary output, the electric generator generating a second electrical power output; and regulating the first and second supplies of fuel responsive to a demand signal representative of an instantaneous power requirement, the second supply of fuel being cut off when the instantaneous power requirement falls below the maximum fuel cell power output.

16. The method of claim 15, wherein the maximum electrical power output of the fuel cell is no greater than about 25% of the maximum sustainable power level.

17. The method of claim 15, wherein the maximum electrical power output of the fuel cell is about 10% of the maximum sustainable power level.

18. The method of claim 15, further including controlling the second portion of the supply of compressed air to achieve a desired air-fuel ratio when generating the heated combustion products.

19. The method of claim 15, further including partially oxidizing the first supply of fuel in a fuel-rich environment.

20. The method of claim 15, further including preheating the first portion of the supply of compressed air before generating the heated combustion products.

* * * * *